United States Patent [19]

Suomi et al.

[11] Patent Number: 5,657,371
[45] Date of Patent: Aug. 12, 1997

[54] CONNECTOR ASSEMBLY FOR A RADIO TELEPHONE AND A COMPUTER

[75] Inventors: Arto Suomi; Mikko Terho, both of Tampere, Finland

[73] Assignee: Nokia Mobile Phones Limited, Salo, Finland

[21] Appl. No.: 702,861

[22] Filed: Aug. 26, 1996

Related U.S. Application Data

[63] Continuation of Ser. No. 188,461, Jan. 26, 1994.

[30] Foreign Application Priority Data

Feb. 1, 1993 [FI] Finland ................................. 93046

[51] Int. Cl.$^6$ ................................. H04M 11/00
[52] U.S. Cl. ................................. 455/418; 455/557
[58] Field of Search ................................. 379/58, 59, 93, 379/98

[56] References Cited

U.S. PATENT DOCUMENTS

| | | | |
|---|---|---|---|
| 4,991,197 | 2/1991 | Morris | 379/58 |
| 5,065,425 | 11/1991 | Lecomte et al. | 379/93 |
| 5,117,452 | 5/1992 | Callele et al. | 379/98 |
| 5,127,041 | 6/1992 | O'Sullivan | 379/59 |
| 5,179,586 | 1/1993 | Lee | 379/93 |
| 5,214,650 | 5/1993 | Renner et al. | 379/93 |
| 5,249,218 | 9/1993 | Sainton | 379/59 |
| 5,408,520 | 4/1995 | Clark et al. | 379/93 |
| 5,428,671 | 6/1995 | Dykes et al. | 379/93 |
| 5,566,226 | 10/1996 | Mizoguchi et al. | 379/58 |

FOREIGN PATENT DOCUMENTS

| | | |
|---|---|---|
| 0 331 610 A3 | 9/1989 | European Pat. Off. . |
| 0 332 825 A2 | 9/1989 | European Pat. Off. . |
| 0 473 297 A2 | 3/1992 | European Pat. Off. . |
| 4020375 A1 | 2/1992 | Germany . |
| 2 177 572 | 1/1987 | United Kingdom . |
| WO 90/03076 | 3/1990 | WIPO . |
| WO 91/07044 | 5/1991 | WIPO . |
| WO 91/07837 | 5/1991 | WIPO . |
| WO 92/10047 | 6/1992 | WIPO . |

OTHER PUBLICATIONS

Finnish Office Action dated Sep. 30, 1993 on priority Finnish Application No. 930436.
English translation of Finnish Office Action.

*Primary Examiner*—Edward L. Coles, Sr.
*Assistant Examiner*—Kimberly A. Williams
*Attorney, Agent, or Firm*—Perman & Green

[57] ABSTRACT

In the connection between a radio telephone and a computer, the functions are divided substantially into two parts: adaptation of the levels of the interface connection wires is handled by the circuits of the cradle (2) of the radio telephone (1), and the control logic is disposed in the communications software (SW) of the computer (3). Physically, the interface comprises an RS232 interface (5) for the control and a two-wire PSTN line (6) between the modem (4) and the telephone.

8 Claims, 1 Drawing Sheet

CONNECTOR ASSEMBLY FOR A RADIO TELEPHONE AND A COMPUTER

This is a continuation of copending application Ser. No. 08/188,461 filed on Jan. 26, 1994.

FIELD OF THE INVENTION

This invention relates to a radio telephone and in particular to a radio telephone connectable to a computer.

BACKGROUND TO INVENTION

The growing use of radio telephones, in particular mobile phones, has brought with it the desire and need to connect mobile phones to mobile office equipment. Users want, for example, to connect their portable computer via a radio connection formed by a radio telephone to another computer to permit data transfer between the two computers. Two essential considerations must be taken into account in the connection between the radio telephone and the computer. First, the modem to be installed in the computer is normally adapted for two-wire connection to the telephone network (PSTN) and this PSTN interface must be adapted to the radio telephone. Second, the control of the set-up, maintenance and disconnection of the radio telephone's transmission connection and, correspondingly, the control of the answering of the incoming call must somehow be arranged such that the communications software in the computer can control the connection.

To address the above-described need, an adapter device for use between a computer and a radio telephone has been developed, which is called, for example, a "teleadapter". One such known arrangement is shown diagrammatically in FIG. 1. FIG. 1 shows a two-wire "PSTN" connection 17 between a modem 4 and a teleadapter 20 (TA). The task of the teleadapter 20 is to carry out a conversion between the two-wire modem interface and the audio interface 16 of the mobile phone 1 and a control channel 15. An advantage of a solution of this kind is that the software (SW) of the computer 3 need not be specially adapted to mobile phone use since ordinary commercially available communications software which controls the set-up of the connection via the modem can be used in the computer. The teleadapter 20 identifies the control characters coming from the line 17 and converts them to the necessary radio telephone control signals on channel 15. On the other hand, the calls received by the radio telephone 1 are indicated on the control channel 15, and by means of this channel's detection signal, the teleadapter 20 forms the corresponding control signals, which pass to the line 17 to activate the computer and receive the call.

A drawback of the above solution is that the signal processing of the control channel calls for control logic in the teleadapter TA, for example, a microprocessor. A solution of this kind increases the total price of the connection arrangement and its complexity substantially.

A variation the above-described teleadapter is disclosed in patent WO 90/03076 (Method and Apparatus for Controlling Transmission of Voice and Data Signals). Naturally, the "teleadapter" described an also be located, for example, inside the computer as a discrete module and it can even be integrated into the modem. This arrangement never the less does not eliminate the above-mentioned drawbacks related to the engineering design.

In a first aspect of the invention there is provided a connector assembly for a radio telephone and a computer, comprising a radio telephone adapter including external audio and control signal interfaces, a computer including a serial port connectable to the control signal interface, and a modem connectable to the computer and the external audio interface, wherein radio communication is set up by the radio telephone under control of signals from the serial port and data communication is achieved via the modem under control of the computer.

The advantage of the invention is that the heretofore complex logic necessary in the radio telephone adaptor is substantially dispensed with. Typically, the connection arrangement is divided into two parts: on the one hand, the adaptation of the levels of the connection wires is handled by matching circuits in the radio telephone's adapter part (cradle/connection wire, for example, in a car) and, on the other hand, all the control logic is adapted for this purpose in the computer's extended communications software. Physically, the connection arrangement in accordance with the invention comprises a serial communication bus to handle the control signals, a two-wire PSTN connection wire as well as the circuits in the radio telephone's teleadapter, by means of which circuits the signal levels of these lines are adapted for the radio telephone's internal connections.

An embodiment in accordance with the invention does not call for a large amount of equipment. The necessary level-matching circuits of the teleadapter are constructionally very simple and thus low in cost. Any substantially complex logic can be implemented in the computer. For example, the communications software in the computer may comprise two parts, one of which controls the modem and the other, via the serial communication bus, the setting up of the radio telephone's radio connection and if necessary answering of the incoming call. By means of the application program, it will be possible to control two physical interfaces, the serial port and the modem's bus interface. The duplication of the programming increases the costs somewhat but additional unit costs do not result from the actual electronics. Furthermore, there is greater flexibility in software applications than in hardware applications.

In a connection arrangement in accordance with the invention the electronic and physical construction of the serial communication bus, for example, RS232, can be known, and the logical signalling on the bus is determined on the basis of the signalling used by the internal control bus of the radio telephone in question.

In a connection arrangement in accordance with the invention, the signals to be transmitted on the audio channel of the modem and the radio telephone are conventional known telephone network signals. The computer modem can be a conventional external box modem or an internal card modem, with automatic ringing or without. In an arrangement in accordance with the invention use is not made of any features which the modem may offer for set-up of a connection, such as automatic ringing. Instead, functions connected with the transmission of payload data alone are used. The modem can also be a modem that transmits telefax signals or a corresponding signal converter.

The invention can be employed advantageously with cellular mobile phones.

BRIEF DESCRIPTION OF THE DRAWINGS

In the following the invention is described in greater detail by way of example only and with reference to the accompanying figures, in which

FIG. 1 of the drawings was already dealt with in the above. FIG. 2 presents, simplifying somewhat, an exemplary embodiment of the connection arrangement in accordance with the invention. A mobile phone 1 operating in a cellular network, i.e., a hand portable telephone, is equipped with an adapter part 7, which has, among other things, connection wires 6 and 5 for external audio signals and control signals, respectively. The computer 3 is equipped with software, and in particular with telecommunications software (SW). In the computer, which in this example is a portable personal computer 3 (PC), there is also an internal card modem 4 (MODEM). The computer has a serial port, RS232, to which the interface 5 for controlling the mobile phone 1 is connected. Modem 4, in turn, is connected to the portable phone by means of a two-wire connection 6, the signals to be transmitted by it being signals that are transmitted down an ordinary telephone line (PSTN), and to the computer via its internal bus (not depicted) according to known means.

Figure 1:
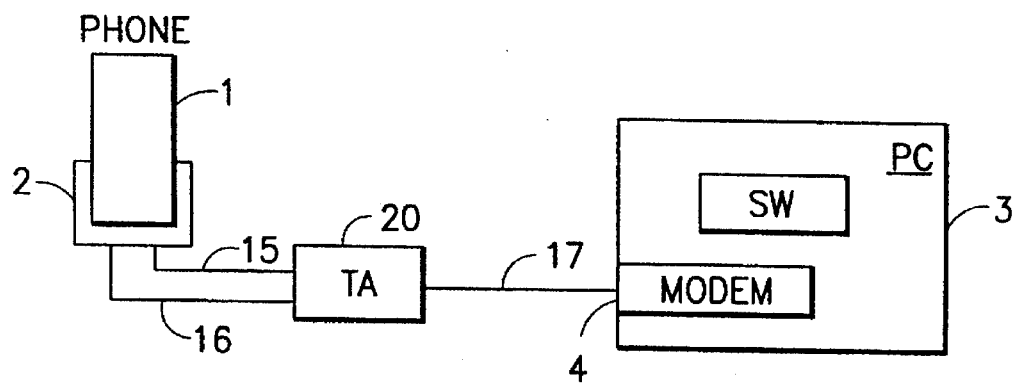
FIG. 1 shows a connection arrangement between a radio telephone and a computer according to the prior art.
Figure 2:
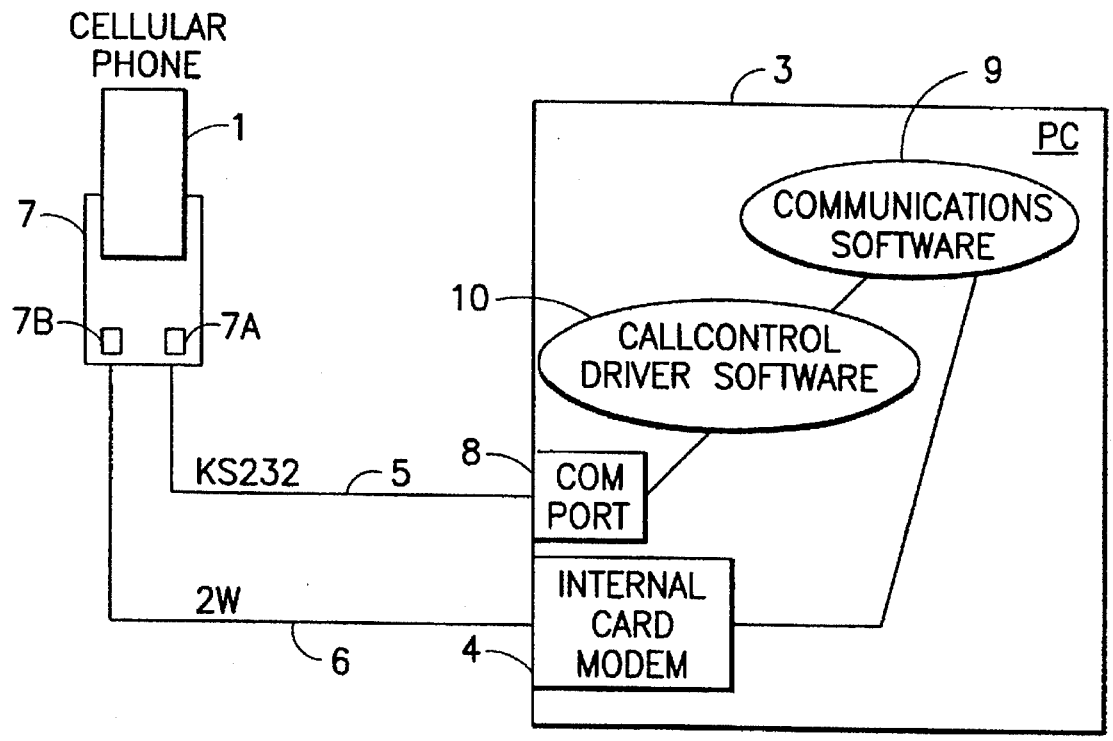
FIG. 2 shows, by way of a schematic simplification, the connection arrangement according to the invention.

The adapter part 7 of the mobile phone 1 is provided with matching circuits 7A and 7B by means of which the levels of the signals of the connection wires 5 and 6 are adapted to the internal levels of the mobile phone. The level of the two-wire connection wire 6 is adapted to the level required by the mobile phone's audio interface, and the level of the communications interface 5 is adapted to the level to be used by the mobile phone's internal control bus. (The mobile phone is processor-controlled in the conventional manner.) The physical dimensioning of the matching circuits depends on the construction of the mobile phone used in each given case and more specifically on the specifications of its interfaces. Presumably, a professional skilled in the art and who has received specifications of this kind knows how to design, in a simple manner, these matching circuits, which can be implemented by means of simple circuit solutions, for example, making use of some previously known principle.

In this embodiment, the communications software in the computer is a two-part program. It can be based on a communications program that is already in use, by means of which the data transfer via the modem is controlled. A new feature in the program is a part by means of which the mobile phone's set-up of a connection is controlled via the serial port. In fact this part could be described as software that picks the control signals formed by the communications program and modifies them to form signals that can be used by the mobile phone's internal control bus (and, correspondingly, receives the signals coming from the mobile phone's internal control bus and modifies the to a form that can be understood by the communications program.) Accordingly, the signals to be transmitted by interface 5 are, for example, call start/indication of an incoming call; call type (data, voice); address (telephone number to which the call is placed); acknowledgements; codes; call termination, etc.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What we claim is:

1. A system for connection of a radiotelephone to a computer, the system comprising:
   a radiotelephone and a computer;
   a modem connecting with the computer for providing communication with the computer via audio signals;
   an adapter connecting with the radiotelephone;
   a first communication cable interconnecting directly between the adapter and the modem for communication of the audio signals between the radiotelephone and the modem;
   a second communication cable interconnecting directly between the adapter and the computer for communication of telephonic control signals between the radiotelephone and the computer;
   wherein the adapter adapts signal levels of the first cable and of the second cable for matching with signal levels of the radiotelephone thereby enabling communication of the audio signals via the first cable and communication of the telephonic control signals via the second cable;
   wherein the computer has a communications program, a first part of the communications program serving to control transmission of the audio signals via the modem over the first cable, and a second part of the communications program generating a portion of the control signals transmitted via the second cable to control operation of the telephone; and
   the control signal generated by the computer in response to the second part of the communication program provides for set up and answering of calls at the radiotelephone.

2. An system as set forth in claim 1 wherein the radio telephone comprises an internal control bus, and wherein the radio telephone adapter comprises level controlling circuits for audio signal, including an interface matching circuit, for adjusting a level to a value employed by the internal control bus.

3. An assembly as set forth in claim 1, wherein the computer is a portable personal computer.

4. A system as set forth in claim 1, wherein the radio telephone is a portable phone operable for a cellular network.

5. A system as set forth in claim 1, wherein the modem is an internal modem connected to the computer's parallel port.

6. A system as set forth in claim 1, wherein the computer has a serial port interface which is an RS232 interface.

7. A system as set forth in claim 1, wherein the modem is a fax modem.

8. A system as set forth in claim 1, wherein the radio telephone adapter is disposed within a radio telephone housing.

* * * * *

UNITED STATES PATENT AND TRADEMARK OFFICE
CERTIFICATE OF CORRECTION

PATENT NO.  : 5,657,371
DATED       : August 12, 1997
INVENTOR(S) : Suomi et al.

It is certified that error appears in the above-identified patent and that said Letters Patent is hereby corrected as shown below:

On the cover page, item [30], the Foreign Application No. should read --930436--.

Signed and Sealed this

Eighteenth Day of November 1997

Attest:

BRUCE LEHMAN

*Attesting Officer*        *Commissioner of Patents and Trademarks*